United States Patent [19]

Dilmore et al.

[11] Patent Number: 4,745,869
[45] Date of Patent: May 24, 1988

[54] METHOD AND APPARATUS FOR CALCINING LIMESTONE USING COAL COMBUSTION FOR HEATING

[75] Inventors: James A. Dilmore, Irwin; Suh Y. Lee, Monroeville; William E. Young, Churchill Boro; Wesley M. Rohrer, Jr., Pittsburgh, all of Pa.

[73] Assignee: Westinghouse Electric Corp., Pittsburgh, Pa.

[21] Appl. No.: 64,723

[22] Filed: Jun. 22, 1987

[51] Int. Cl.[4] ............................................. F23D 1/00
[52] U.S. Cl. ..................................... 110/347; 110/208; 110/228; 110/246; 110/266; 432/13; 432/14; 432/111
[58] Field of Search ............... 110/246, 255, 257, 258, 110/259, 347, 229, 230, 233, 234, 203, 204, 208, 210, 212, 214, 301, 302, 303, 304, 165 R; 60/39.511; 432/103, 105, 106, 111, 116, 13, 14

[56] References Cited

U.S. PATENT DOCUMENTS

| | | |
|---|---|---|
| 2,274,780 | 3/1942 | Duerr et al. ........................ 110/234 |
| 2,808,012 | 10/1957 | Schindler . |
| 2,918,024 | 12/1959 | Seidl . |
| 3,124,086 | 3/1964 | Sage et al. . |
| 3,242,888 | 3/1966 | Klovers et al. . |
| 3,261,333 | 7/1966 | Jonakin ............................... 122/479 |
| 3,412,697 | 11/1968 | Matteini . |
| 3,461,037 | 8/1969 | Knappstein et al. ........... 432/111 X |
| 3,763,830 | 10/1973 | Robinson et al. ................... 122/4 D |
| 3,938,450 | 2/1976 | Jaronko et al. . |
| 4,037,543 | 7/1977 | Angelo ............................ 110/302 X |
| 4,089,631 | 5/1978 | Giles ................................ 110/260 X |
| 4,259,081 | 3/1981 | Reuter et al. ...................... 432/13 X |
| 4,464,111 | 8/1984 | Raslogi et al. ................... 110/212 X |
| 4,473,014 | 9/1984 | Dejanovich .......................... 110/264 |
| 4,539,918 | 9/1985 | Beer et al. .......................... 110/266 |
| 4,541,346 | 9/1985 | Culliford ............................. 110/246 |

Primary Examiner—Steven E. Warner

[57] ABSTRACT

A method and apparatus for calcining limestone to produce lime wherein coal is combusted to provide heat for the calcination. The coal is combusted in a two stage combustion unit, with at least seventy-five percent of the slag formed by the coal combustion removed from the first stage of the combustion unit. Residual gases and fuel are further combusted in the second stage of the two stage combustor, with hot combustion gases therefrom, having the molten slag removed, fed directly to the calcining chamber of a rotary lime kiln. The coal may be carbonized to form a char and a fuel gas for use in the two stage combustor.

18 Claims, 6 Drawing Sheets

METHOD AND APPARATUS FOR CALCINING LIMESTONE USING COAL COMBUSTION FOR HEATING

REFERENCE TO RELATED APPLICATIONS

Reference is made to a related application entitled "Lime Kiln and Method of Retarding Formation of Slag Ring Therein", filed Jun. 22, 1987 as Ser. No. 64,722 in the names of J. A. Dilmore, A. B. Turner, W. E. Young and W. M. Rohrer, assigned to the assignee of the present invention.

FIELD OF THE INVENTION

The present invention relates to coal firing of rotary lime kilns and a method and apparatus whereby the build-up of a slag ring within the rotary kiln is prevented.

BACKGROUND OF THE INVENTION

In the production of lime from limestone, the limestone is heated in a calcining chamber so as to decompose the same and drive off carbon dioxide according to the general equation:

$$CaCO_3 + Heat \rightarrow CaO + CO_2$$

with heating of the limestone to a high temperature and holding it at that temperature for a period of time to effect the decomposition. This calcination, or "burning", requires a large amount of heat.

When calcining of limestone is effected in a rotary kiln, the kiln generally is a long, straight tubular steel vessel that is lined on the inside with refractory material. The kiln rotates about an axis at an angle of a few degrees, such as 3° to 5°, to the horizontal, and rests on trunnions which rotate the tubular shell. Limestone, calcium carbonate, is introduced to a calcining chamber in the rotary vessel at the upper end and is decomposed, by heat, to calcium oxide which is extracted at the lower end. A combustor is attached at the lower end and burning fuel, such as oil, natural gas, or coal provides heat to the lower end of the calcining chamber of the rotary vessel. Combustion products and carbon dioxide are removed from the upper end of the rotary vessel. Little attempt is made to recover heat other than quenching the hot calcium oxide in the air stream which is, in turn, used in the combustion process. The exhaust gases from the kiln may be cleaned by use of a wet scrubbing unit.

In recent years, rotary lime kilns have operated using natural gas or oil as fuel in the combustor, but coal is a preferred fuel due to its lower cost. A typical small kiln with an 8½ feet diameter casing, 150 feet long, and an inner diameter of 7½ feet, has an output of about 200 tons per day of lime and uses 0.275 tons of coal per ton of lime produced. This represents a heat input of $60 \times 10^6$ BTU/hour when burning a typical coal containing 6.9 percent ash, 2 to 3 percent sulfur and having a higher heating value of 13,000 BTU/pound.

The use of coal as a fuel in firing a lime kiln results in molten slag, in dispersed form, being fed to the calcining chamber along with the hot combustion gases produced. This molten slag, when contacting the cooler inner surface of the rotary kiln adheres to the surface and subsequently forms a slag ring. After a period of operation, the slag ring builds up to a size such that a major blockage to flow through the kiln results, and the kiln must be shut down and the slag ring physically removed. The removal of the slag ring requires many mandays of effort, with this maintenance expense incurred in addition to the loss of production of the kiln.

It is an object of the present invention to provide a method for coal firing of a lime kiln which retards the build-up of a slag ring in the calcining chamber of the kiln by removing the bulk of the molten slag, or ash, from the combustion gases prior to introduction of the gases into the calcining chamber.

It is another object of the present invention to provide an improved lime kiln for use with coal combustion wherein a two stage combustor is used, with at least 75 percent of molten slag formed removed from the first stage of the two stage combustor, prior to introduction of hot combustion gases into the calcining chamber of a rotary lime kiln.

SUMMARY OF THE INVENTION

A method of firing a lime kiln using coal as a fuel, where the coal is combusted in a two stage combustion unit. At least seventy-five percent of the molten slag produced by the combustion of coal is removed from a first stage of the two stage combustor and does not enter the calcining chamber or a rotary lime kiln, thus retarding the build-up of any slag ring on the inner wall of the rotary vessel that forms the calcining chamber. Combustion of the gases from the first stage of the two stage combustor is further effected in the second stage thereof after the bulk of the molten slag has been removed.

Various embodiments of the present method comprise preheating of the air fed to the two stage combustor by heat exchange with the hot exhaust gases from the rotary vessel, and use of carbonization of the coal to produce a char and fuel gas, both of which are used in combustion to provide heat to the calcining chamber for calcination of limestone in producing lime. In another embodiment, a portion of the fuel gas from the carbonization may be fed to the calcining chamber for combustion therein.

In a further embodiment, transpiration devices, such as porous blocks, may be used to inject fuel and/or air into the calcining chamber at a location spaced from the lower end thereof, to effect heat distribution along the calcining chamber.

The improved lime kiln of the present invention includes a two-stage combustion unit for combustion of coal, including means in the first stage thereof for removal of at least seventy-five percent of the molten slag therefrom prior to introduction of the hot gas stream produced into the calcining chamber. A preheater for the air fed to the two-stage combustor, a carbonizer to produce char and fuel gas with means for feeding the same to the combustor, or a portion of the fuel gas to the interior of the calcining chamber, and transpiration devices within the calcining chamber may be provided in alternate embodiments of the present lime kiln.

DETAILED DESCRIPTION

In the present method for firing a lime kiln, a two stage slagging combustion unit is used to combust a carbonaceous fuel, such as coal, with at least seventy-five percent of the slag resulting from the combustion removed from the first stage of the combustion unit. Hot combustion gases from the first stage, which, due to incomplete combustion contain combustible components, are further combusted in the second stage of the combustion unit and the hot gaseous stream therefrom is charged to the calcining chamber of the lime kiln.

The two stage combustion unit that is used in the present invention is a known and commercially available type of combustion unit.

The terms lime and limestone, as used herein are meant to include not only calcium oxide and calcium carbonate but other calcium oxide and calcium carbonate containing mixtures of alkaline earth metal oxides and carbonates, such as dolomite, a mixture of calcium carbonate and magnesium carbonate, and the resulting oxide formed upon calcination thereof. The terms lime and limestone will be used in the present specification, however, for the purpose of brevity.

The present method is described in the schematic representations in the accompanying drawings which will now be described.

Figure 1:
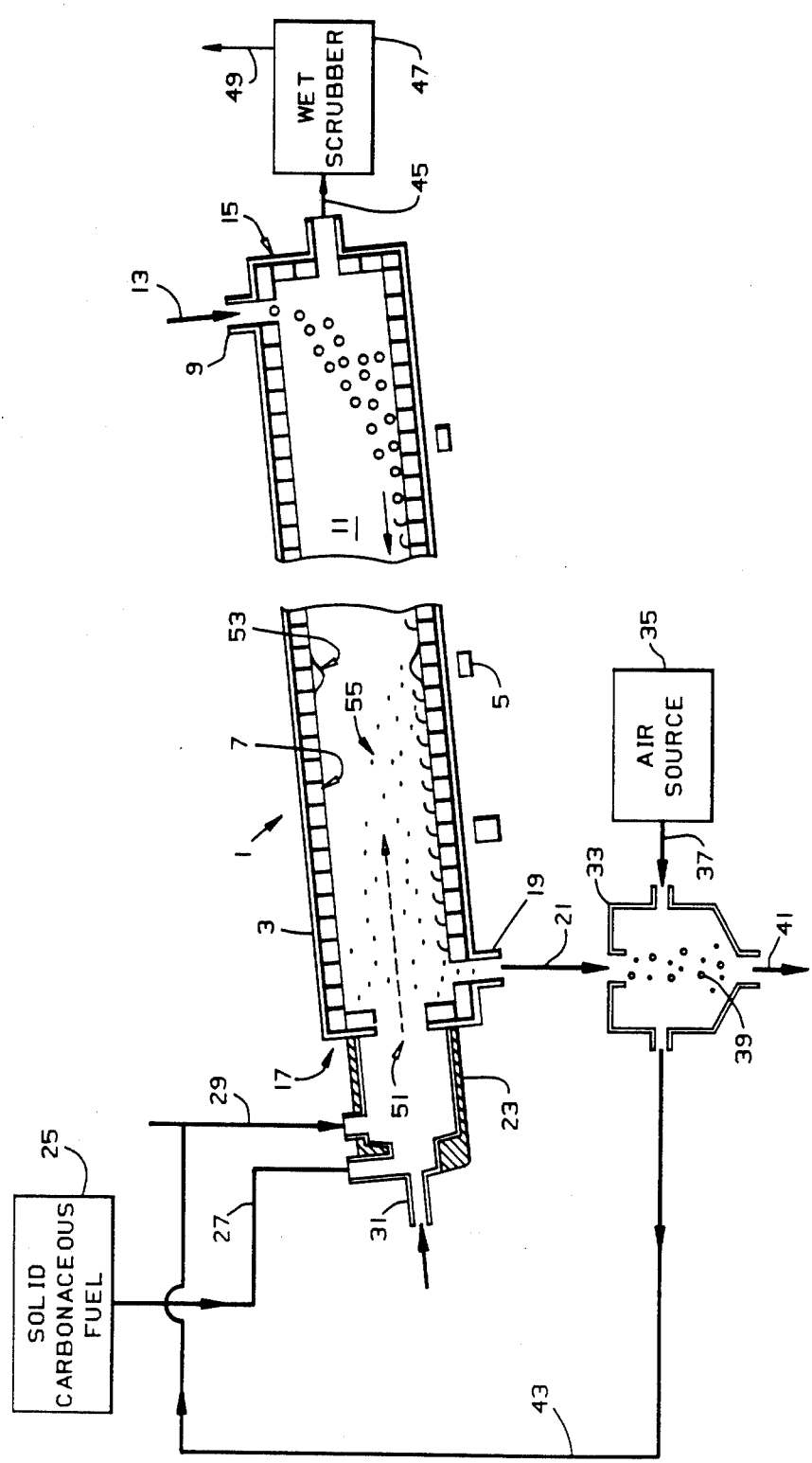
FIG. 1 is a schematic, cross-sectional view of a conventional coal-fired lime kiln having a cross-section taken along the longitudinal axis of the rotary vessel.

FIG. 1 illustrates a conventional coal-fired lime kiln 1 which has a rotary vessel 3 slightly inclined from the horizontal, that is mounted for rotation about its axis, such as by rollers 5 having drive means (not shown) for causing rotation of the vessel. The vessel is a generally cylindrical vessel having a refractory inner wall 7, and an inlet 9 for the introduction of limestone to the interior calcining chamber 11 of the vessel through line 13, adjacent one end 15 thereof, the upper end which is elevated relative to the horizontal axis. Adjacent the other, or lower, end 17 of the vessel is a discharge outlet 19 which serves to discharge lime, produced in the rotary vessel 3, along with other solids, such as slag, through line 21. A coal combustor or burner 23 is provided at the lower end 17 of the vessel to which coal or other carbonaceous fuel is charged from a source 25 through line 27 to the combustor 23, while air or other oxygen-containing gas is charged thereto through line 29. An auxiliary pilot or ignition burner and source of natural gas or other fuel is provided at 31. A heat exchange unit 33 may be provided to preheat air charged to the burner, with air from a source 35 fed through line 37 to the heat exchange unit 33 wherein the air is heated by hot lime product 39 passing therethrough. The cooled lime product is discharged from heat exchange unit through line 41, while the preheated air is passed through line 43 to line 29 for use as combustion air in the combustor 23. Hot exhaust gases, including combustion products, carbon dioxide released in the calcination of the limestone, and finer particulates, from the rotary vessel 3 are discharged through line 45 to a scrubber 47 for cleaning, and are then discharged to the atmosphere through line 49.

In operation of the conventional lime kiln 1, limestone is charged from line 13 through inlet 9 to the rotating vessel 3, and travels downwardly through the rotating vessel from the upper end 15 towards the lower end 17 of the vessel 3 as indicated by the solid arrow. Hot combustion gases produced in the combustion unit or combustor 23, along with molten slag formed by the combustion of coal, are charged through an opening 51, in the lower wall 17, into the calcining chamber 11 and pass through the vessel 3 countercurrent to the flow of the limestone and the lime produced in the vessel 3, as indicated by the dashed arrow. The limestone is decomposed by heat, to lime, releasing carbon dioxide, during passage through the rotary vessel, with the combustion gases, and carbon dioxide gases resulting from the limestone decomposition, being discharged through line 45. The buildup of a slag ring on the refractory inner wall 7 will occur after a period of time of operation of the kiln due to the molten slag that is introduced into the calcining chamber 11 along with the hot combustion gases, from combustion of coal. This slag ring will eventually require shut down of the kiln and removal of the slag ring, which retards flow of limestone and lime product therethrough. The slag ring 53 is indicated in FIG. 1, at an early stage, while vaporized slag from the combustor is indicated at 55.

The present invention provides a means for retarding the buildup of a slag ring on the inner wall of the vessel by removal of at least 75 percent of the slag formed during combustion of the coal prior to introduction of the resultant combustion gases into the calcining chamber.

Figure 2:
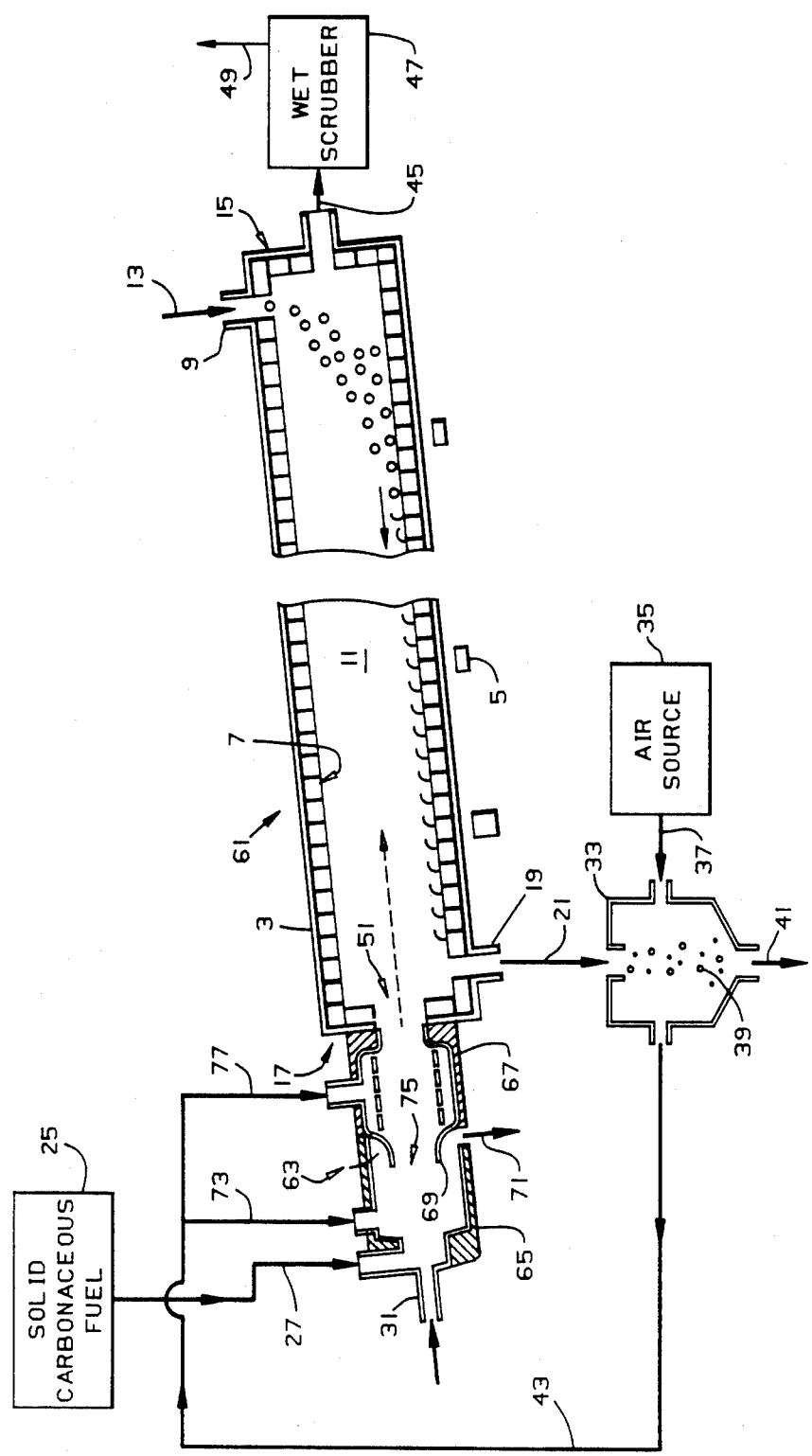
FIG. 2 is a schematic, cross-sectional view similar to FIG. 1, illustrating an embodiment of the lime kiln of the present invention.

A lime kiln 61, for use in practicing the method of the present invention is illustrated in FIG. 2, with components that are conventional in such lime kilns as illustrated in FIG. 1 having the same numeric designation. In the present lime kiln, a two stage slagging combustor 63 is provided, the two stage combustor having a first stage 65, preferably a vortex, and second stage 67. In the first stage 65, a carbonaceous fuel is charged through line 27 from a source 25, and combusted with air from line 73. The air supplied to line 73 through line 43 has been preheated in the heat exchanger 33. In the first stage 65 of the two stage combustor 63, hot combustion gases and molten slag are produced, and the molten slag, or at least greater than 75 percent thereof, preferably about 85 percent, is separated such as by baffle 69 from the hot combustion gases and discharged from the combustor through line 71. Insufficient air is introduced into the first stage 65 of the two stage combustor, with the resultant hot combustion gases containing combustible components fed to the second stage 67 through opening 75 connecting the two stages. Additional preheated air is then charged through line 77 to the second stage 67, with complete combustion effected therein, and the hot combustion gases, with at least 75 percent of the molten slag removed therefrom, are fed to the calcining chamber 11 of rotary vessel 3 through opening 51, for countercurrent flow therethrough relative to the limestone fed and lime produced therein.

By removing at least 75 percent of the molten slag from the combustion gases fed to the calcining chamber of the kiln, the buildup of a slag ring on the inner wall of the rotary vessel is at least retarded, and potentially eliminated, depending upon the composition of the carbonaceous fuel and the kiln operating conditions. The improved kiln otherwise operates in a conventional manner, with the calcination effected in the calcining chamber by heat from the hot combustion gases passing countercurrent to the flow of solids therein.

Figure 3:
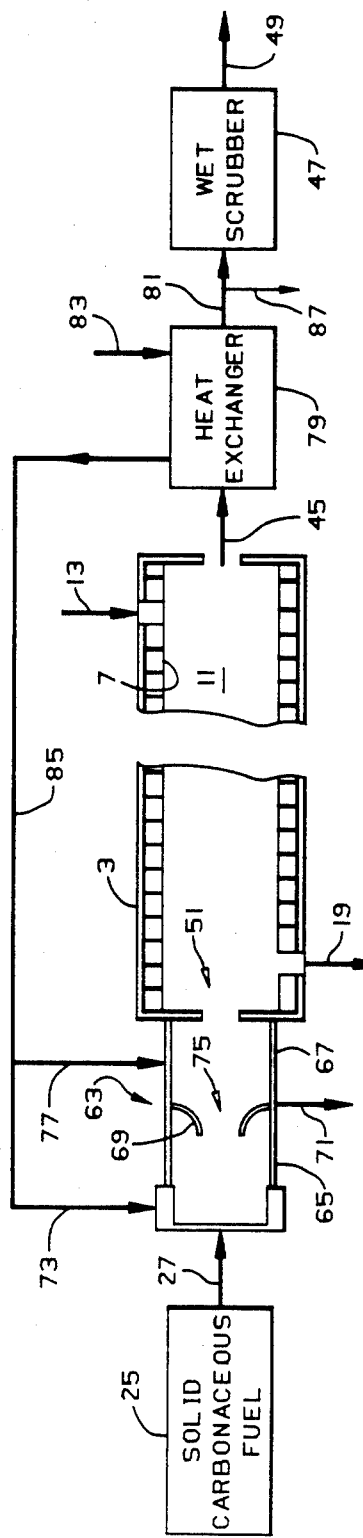
FIG. 3 is a schematic, cross-sectional view of another embodiment of the present invention wherein air fed to the two-stage combustor is preheated by heat exchange with hot exhaust gases from the rotary vessel.

FIG. 3 schematically illustrates a further embodiment of the present invention wherein preheated air for combustion in the two stage combustor 63 is provided by heat exchange between a supply of air and the hot exhaust gases from the rotary kiln. As illustrated, the hot exhaust gases in line 45 from the rotary vessel 3, which comprise combustion products, carbon dioxide and particulates pass through a heat exchanger 79 and then through line 81 prior to passage to the wet scrubber 47. Air from a source (not shown) is passed through line 83 and heated, by indirect heating, through contact with the hot exhaust gases, and is then charged through line 85 to line 73 for use in the first stage 65 of the combustor, and a portion thereof to line 77 for use in the second stage 67 of the combustor.

Figure 4:
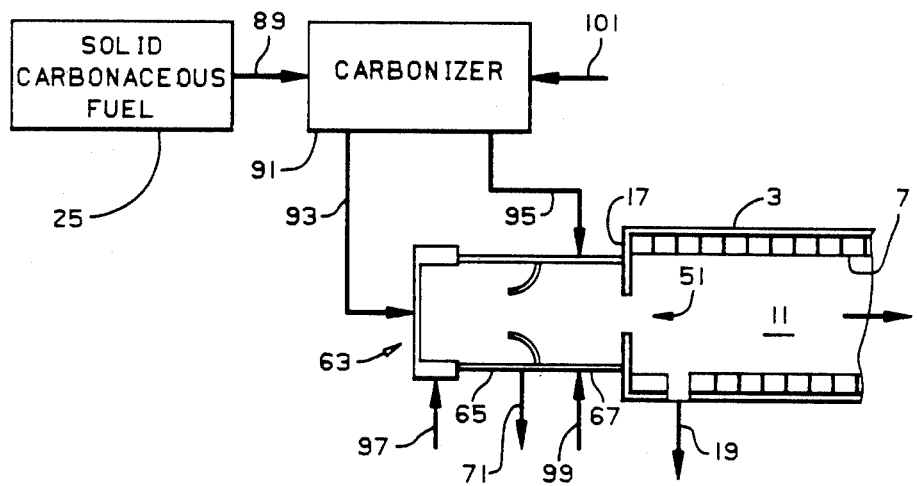
FIG. 4 is a schematic representation of a further embodiment of the present invention wherein coal is carbonized to produce a char and a fuel gas which are then combusted in a two stage combustor.

In FIG. 4, an embodiment of the present invention is schematically illustrated where the carbonaceous fuel is converted to a char and a fuel gas prior to use thereof in the two stage combustor. The carbonaceous fuel 25 from line 89 is charged to a carbonizer 91 wherein the carbonaceous fuel is heated so as to produce a char that is discharged therefrom through line 93, and a fuel gas that is discharged therefrom through line 95. The char is combusted with air in the first stage 65 of the two stage slagging combustor 63, and at least 75 percent of the molten slag formed during said combustion is removed from the first stage 65 as illustrated at 71. The hot combustion gases from first stage 65, when fuel rich combustion is effected, are passed to the second stage 67 where combustion of the gases is completed in the presence of air, and the hot combustion gases from the two stage combustor 63 are then charged through opening 51 into the calcining chamber 11. Because of the removal of at least 75 percent of the molten slag prior to introduction of the hot combustion gases into the calcining chamber, the formation of a slag ring therein is retarded or eliminated. Air is introduced through line 97 to the first stage 65 of the two stage combustor 63, while air, in a fuel rich first stage combustion, is introduced through line 99 to the second stage 67 of the two stage combustor. Heat for the carbonizer is supplied through line 101, and may comprise hot exhaust gases from the kiln. These hot exhaust gases are supplied through take-off line 87 (FIG. 3) into line 101 for use in the carbonizer.

With use of a carbonizer, the heating value of the coal will be divided so as to generate, for example, a char having a heating valve of about 12,000 BTU/pound and a fuel gas having a heating value of about 250 BTU/standard cubic feet. The ash in the coal remains in the solid char, which is used to fire the first stage of the two stage combustor, with molten slag formed therein and removed. The first stage of the two stage combustor will operate fuel rich at a stoichiometric ratio of 0.75 with oxygen. The temperatures produced will be high enough to insure complete pyrolysis of the char without generating excess flame temperatures which would vaporize some of the ash constituents in the char. This embodiment would also minimize emmission of nitrogen oxides which are produced during combustion of carbonaceous fuels. With use of the carbonizer 91, the first stage 65 of the two stage combustor 63 may also be operated oxygen rich. In such an embodiment, hot oxygen rich combustion gases from the first stage 65 are passed to the second stage 67 where combustion of the fuel gas is completed in the presence of the hot oxygen rich first stage combustion products, and the hot combustion gases from the two stage combustor 63 are then charged through opening 51 into the calcining chamber. In such an oxygen rich mode, no air or oxygen would be charged through line 99, which may thus be eliminated. With the first stage of the two stage combustor operating air or oxygen rich, the ratio of oxygen to fuel would be greater than one, and would depend upon the amount of fuel gas charged to the second stage relative to char fed to the first stage, preheat temperatures, and the like. In this embodiment also, however, at least 75 percent of the molten slag would be removed prior to introduction of the hot gases into the calcining chamber.

Figure 5:
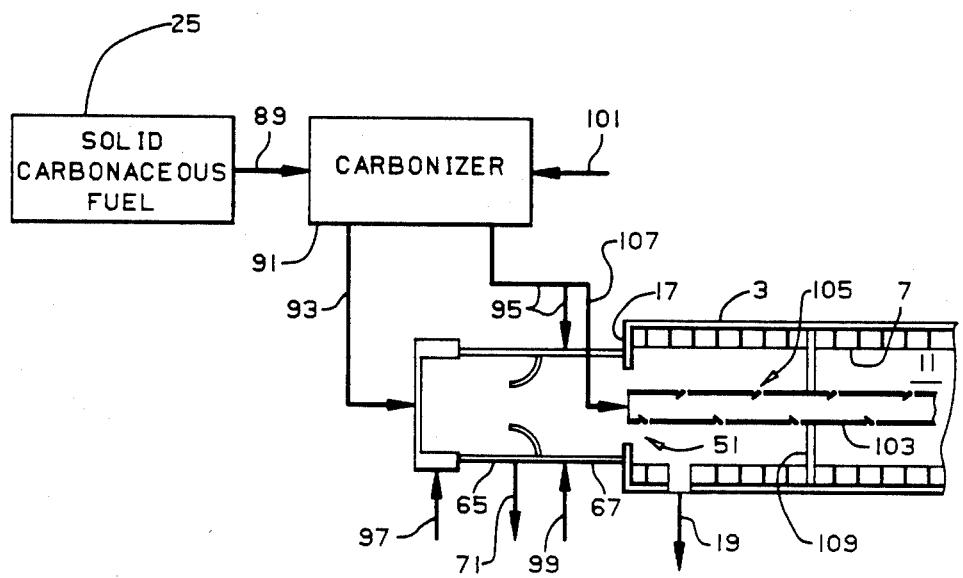
FIG. 5 is a schematic representation of another embodiment similar to that of FIG. 4, wherein a portion of the fuel gas produced by carbonization is charged to the calcining chamber for combustion therein.

FIG. 5 illustrates an alternative embodiment of the use of a carbonizer, as shown in FIG. 4, wherein a portion of the fuel gas produced in the carbonizer is distributed along the axis of the calcining chamber of the rotary vessel. As illustrated, a fuel gas distributing means 103 is provided coaxial with the vessel 3, extending from the opening in lower end wall 17. A portion of the fuel gas from line 95 is passed through line 107 to a fuel gas distributing means 103, shown as an axially extending conduit with apertures 105 through the side wall thereof. Apertures 105 in the distributing means enable introduction of the fuel gas along a portion of the length of the vessel. Radial struts 109 may be provided to support and position the distributing means, which struts are affixed to the wall of the vessel. In this embodiment, a portion of the fuel gas is distributed along the length of the calcining chamber while the remainder is added to the second stage of the two stage combustor to reach higher temperatures at the entrance of the calcining chamber. Beyond the entrance to the calcining chamber and along the reaction zone of the chamber, that portion of the fuel gas is admitted to maintain a predetermined temperature profile in the calcining chamber for optimum calcination of the limestone. Excess air would be provided in the combustor to effect combustion of the added fuel gas within the calcining chamber. The shape of the temperature profile would be determined by experiment but should be such that molten slag does not result in formation of a slag ring at any point along the inner wall of the rotary vessel.

Figure 6:
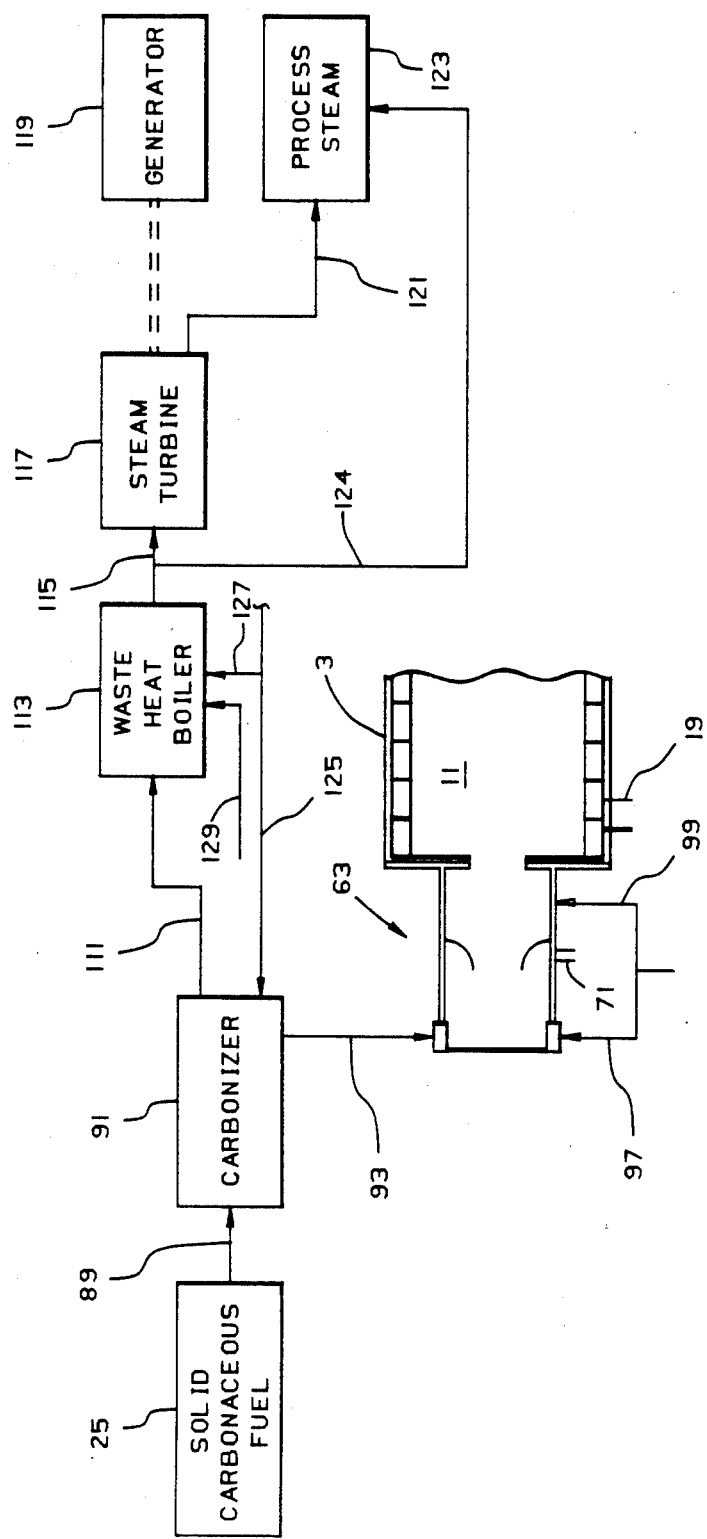
FIG. 6 is a schematic representation of an embodiment of the present invention wherein excess combustion products from a carbonizer are directed to a waste heat boiler for the production of steam and then electrical energy.
Figure 7:
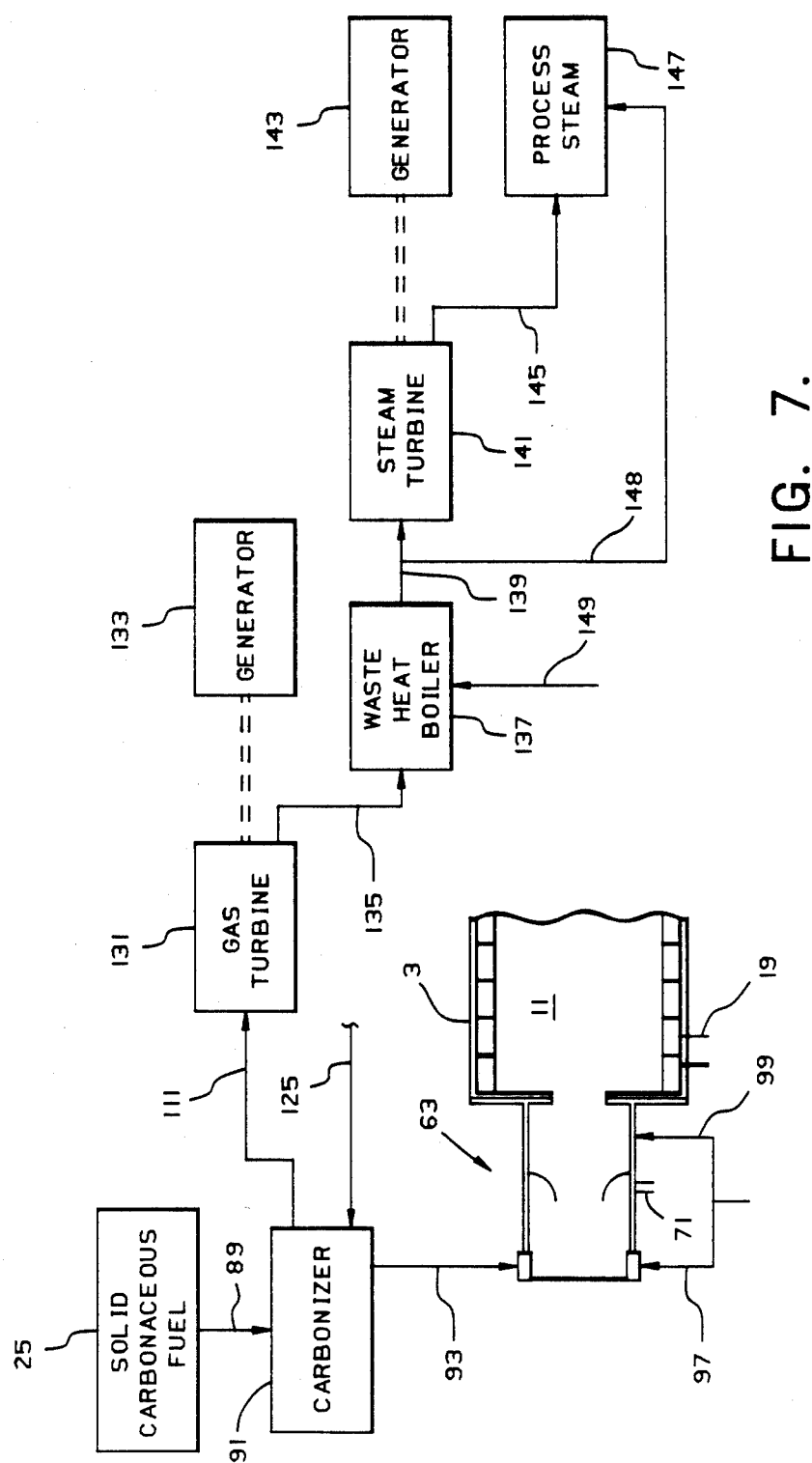
FIG. 7 is a schematic representation of a further embodiment of the present invention wherein excess combustion products from a carbonizer are directed to a gas turbine for production of electrical energy, and hot exhaust from the gas turbine used in a waste heat boiler for production of steam and electrical energy (cogeneration)

Various systems using the present lime kiln, with a carbonizer unit 91, in conjunction with other energy systems, such as turbine systems or steam generator systems are illustrated in FIGS. 6 and 7. In FIG. 6, for example, excess combustion products from the carbonizer 91 may be carried through discharge line 111 to a waste heat boiler 113. Steam produced in waste heat boiler 113 is passed through line 115 and can be used to operate a steam turbine 117. Steam turbine 117 will operate a generator 119 to produce electrical energy, while excess steam can be passed through line 121 to provide a source of process steam 123. Also, a line 124 may be provided, with steam from line 115, from the waste heat boiler 113, passed through line 124 for use as process steam, avoiding the steam turbine 141. In such a system, exhaust gas from the heat exchanger and/or the scrubber can be fed through line 125 to the carbonizer 91, with an off-take line 127 provided to the waste heat boiler, if desired. The waste heat boiler 113 may be provided with a supplemental firing system that will charge hot gases through line 129 to the waste heat boiler for use in startup of the system and provision of extra power when needed, to make the overall system self-sufficient, i.e., power to drive the kiln rotary means, and the like.

In FIG. 7, excess combustion products from the carbonizer 91 pass through discharge line 111 to a gas turbine 131 which operates a generator 133 for the production of electrical energy. Combustion products from the gas turbine are carried through line 135 to a waste heat boiler 137. Steam produced in the waste heat boiler 137 passes through line 139 to a steam turbine 141 which operates a generator 143 for the production of electrical energy. Excess steam for the steam turbine 141 passes through line 145 to provide a supply of process steam 147. In this embodiment, a line 148 may be provided, with steam from line 139, from the waste heat boiler 137, passed through line 148 for use as process steam, avoiding the steam turbine 141. As in the previous embodiment, hot combustion gases from a supplemental firing system may be charged through line 149 to the waste heat boiler 137 for use in startup and operation of auxiliary equipment.

The energy produced by these latter two embodiments may be used for mechanically driving the rotating means for the kiln and the various pumps and blowers normally associated with conventional lime kilns.

Figure 8:
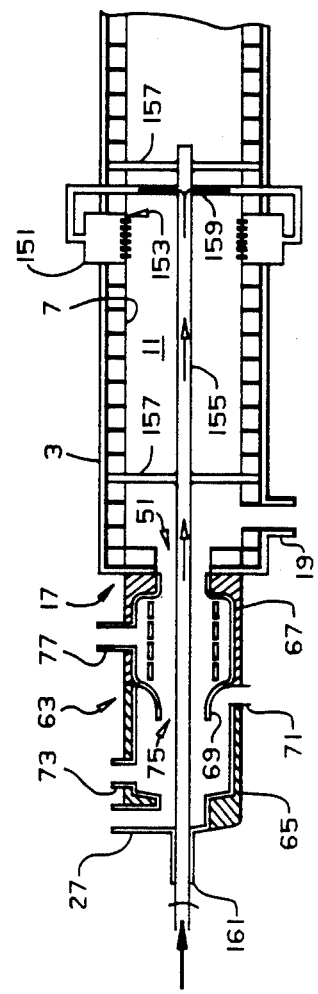
FIG. 8 is a schematic, cross-sectional view of an embodiment of the present invention wherein a transpiration device is provided in the calcining chamber to enable various alternate combustion modes within the calcining chamber.

In the embodiment of the present invention illustrated in FIG. 8, a transpiration device is used, in addition to the two stage combustor, to effect heat distribution along the calcining chamber 11. A transpiration device, such as a porous form 151, is provided along the inner wall 7 of the vessel 3, displacing a portion of the refractory lining, with the inner surface 153 thereof facing the calcining chamber 11, inner surface 153 being a fluid dispensing surface. Such a porous form may be comprised of a ceramic, cermet, or a high temperature compatible metal alloy. A feed conduit 155, is supported co-axially within the calcining chamber 11 by the use of struts 157. Radially outwardly extending branch conduits 159 communicate between the feed conduit 155 and the porous forms 151. A bearing and seal unit 161 is provided in the wall of the two stage combustor 63 through which the feed conduit 155 extends.

The use of the transpiration device enables various alternate combustion modes in the calcining chamber. When the two stage combustor is operated fuel rich, secondary air could be introduced into the calcining chamber through the transpiration devices to prevent formation of a slag ring and provide oxidant to complete combustion of the gases from the two stage combustor. The introduction of a gaseous fuel through the transpiration device would result in combustion thereof, with sufficient air provided, as it passes into the gaseous steam in the calcining chamber. Such introduction would supply heat, eliminating the need for overfiring at the entrance to the calcining chamber. Such gaseous fuel could be in the form of a gas or a vaporized liquid. Premixed combustibles could also be used in the transpiration devices, wherein a sufficient amount of oxidant is supplied along with a fuel for introduction into the calcining chamber. In all cases, the fluids must be cleaned carefully to prevent plugging of the porous sections of the transpiration devices.

The present invention thus provides a method and apparatus for calcining of limestone to lime using coal as a fuel without the build-up of a slag ring in the calcining chamber of a rotary kiln. The two stage combustor provides for removal of at least seventy-five percent of the molten slag from the hot combustion gases prior to introduction thereof into the calcining chamber. The system can be integrated with combined cycle and cogeneration for greater economy.

What is claimed is:

1. A method of firing a lime kiln having a calcining chamber in rotary vessel with limestone charged to one end thereof and hot gases applied to the other end, with a hot gas stream passing therethrough countercurrent to the flow of limestone to produce lime, such that the formation of a slag ring in said rotary vessel is retarded or eliminated comprising:

providing a two stage combustion unit for producing said hot gases;

charging a solid carbonaceous fuel and air in the first stage of said two stage combustion unit and combusting the fuel, with less than a stoichiometric amount of oxygen to produce substantially complete combustion of said solid carbonaceous fuel, to provide hot combustion gases and molten slag in said first stage;

removing at least 75 percent of said molten slag from said hot combustion gases and discharging said slag from said first stage of the two stage combustion unit;

passing said hot combustion gases and any residual solid carbonaceous fuel into the second stage of said two stage combustion unit;

charging air to said second stage to effect combustion of said hot combustion gases and any residual solid carbonaceous fuel in said second stage of the two stage combustion unit, to product a hot gas stream; and directly charging said hot gas stream into said calcining chamber for countercurrent flow therethrough relative to the flow of limestone therein, and exhaustion therefrom.

2. The method of firing a line kiln as defined in claim 1 wherein said air charged to said first stage and said second stage of said two stage combustion unit is preheated by heat exchange with said hot gas stream following exhaustion of said hot gas stream from the lime kiln.

3. The method of firing a lime kiln as defined in claim 1 wherein a fuel is injected into the calcining chamber at a location spaced from said two stage combustion unit, and excess air provided to effect combustion of said injected fuel within said calcining chamber.

4. The method of firing a lime kiln as defined in claim 1 wherein air is injected into the calcining chamber at a location spaced from said two stage combustion unit, and excess fuel is provided so as to effect combustion thereof within said calcining chamber.

5. The method of firing a lime kiln as defined in claim 1 wherein said solid carbonaceous fuel is carbonized by heat to produce a carbonaceous char and a fuel gas prior to combusting the same in said two stage combustion unit.

6. The method of firing a lime kiln as defined in claim 5 wherein said carbonaceous char is combusted in the first stage of said two stage combustion unit and said fuel gas is combusted in the second stage of said two stage combustion unit.

7. The method of firing a lime kiln as defined in claim 6 wherein excess air for combustion of the char is charged to the first stage of said two stage combustion unit, and no further air is charged to the second stage, such that combustion of the fuel gas is effected in said second stage with said excess air.

8. The method of firing a lime kiln as defined in claim 6 wherein a portion of said fuel gas is distributed within said calcining chamber for combustion therein.

9. The method of firing a lime kiln as defined in claim 8 wherein said carbonaceous char is combusted in the first stage of said two stage combustion unit and said fuel gas is used to produce steam for the production of electrical energy.

10. The method of firing a lime kiln as defined in claim 9 wherein said carbonaceous char is combusted in the first stage of said two stage combustion unit and said fuel gas is used in a gas turbine for the production of electrical energy.

11. The method of firing a lime kiln as defined in claim 10 wherein hot exhaust gases produced in said gas turbine are used to produce steam for the production of electrical energy, and to provide a source of process heat.

12. In a lime kiln having a calcining chamber in a rotary vessel and means for charging limestone at one end thereof and removing lime from the other end thereof, with means for charging a hot gas stream through the calcining chamber thereof countercurrent to the flow of limestone and lime therein, wherein coal is combusted with air to produce said hot gas stream which contains molten slag, the improvement comprising; a two stage combustion unit for the combustion of said coal including means in the first stage of said two stage combustion unit for the removal of at least 75 percent of molten slag therefrom prior to introduction of said hot gas stream into said calcining chamber.

13. In a lime kiln as defined in claim 12 the improvement including means for preheating said air, prior to combustion, comprising a heat exchanger for indirect heating of said air through contact with hot exhaust gases discharged from said calcining chamber.

14. In a lime kiln as defined in claim 12, the improvement wherein a transpiration device is provided along the inner wall of the rotary vessel for injection of a fluid into said calcining chamber.

15. In a lime kiln as defined in claim 12, the improvement comprising mean for carbonizing said coal to produce a carbonaceous char and a fuel gas, prior to combustion in said two stage combustion unit, means for charging said char to said first stage, and means for charging said fuel gas to said second stage of said two stage combustion unit.

16. In a lime kiln as defined in claim 15, the improvement comprising a fuel gas distributing means axially positioned in said calcining chamber and means for passing a portion of the fuel gas from said carbonizer through said fuel gas distributing means for combustion within said calcining chamber.

17. In a lime kiln as defined in claim 16 the improvement wherein said fuel gas distributing means comprises a conduit with apertures through the side wall thereof.

18. In a lime kiln as defined in claim 17, the improvement wherein radial struts are provided to support and position said conduit coaxially within said calcining chamber.

* * * * *